United States Patent [19]
Kluth

[11] Patent Number: 5,089,916
[45] Date of Patent: Feb. 18, 1992

[54] ARRANGEMENT FOR SUPPRESSING EDGE NOISE DURING PLAYBACK OF FREQUENCY MODULATED VIDEO SIGNALS RECORDED ON TAPE

[75] Inventor: Hans-Jürgen Kluth, Villingen-Schwenningen, Fed. Rep. of Germany

[73] Assignee: Deutsche Thomson-Brandt GmbH, Villingen, Fed. Rep. of Germany

[21] Appl. No.: 291,341

[22] Filed: Dec. 28, 1988

Related U.S. Application Data

[63] Continuation of Ser. No. 15,057, filed as PCT/EP86/00340, Jun. 6, 1986, abandoned.

[30] Foreign Application Priority Data

Jun. 10, 1985 [DE] Fed. Rep. of Germany ....... 3520722

[51] Int. Cl.$^5$ .................................................. H04N 5/78
[52] U.S. Cl. .................. 360/33.1; 360/38.1; 358/314; 358/327
[58] Field of Search .............. 360/19.1, 33.1, 38.1; 358/335, 336, 340, 343, 166, 167, 314, 327, 328, 329, 39, 162

[56] References Cited

U.S. PATENT DOCUMENTS

| | | | |
|---|---|---|---|
| 3,629,494 | 12/1971 | Hurst | 358/336 |
| 3,943,274 | 3/1976 | Pickopp et al. | 358/340 |
| 4,291,330 | 9/1981 | Hiroi | 358/39 |
| 4,302,768 | 11/1981 | Kamura | 358/167 |
| 4,492,988 | 1/1985 | Hashimoto et al. | 358/336 |
| 4,591,930 | 5/1986 | Baumeister | 360/35.1 |
| 4,607,285 | 8/1986 | Hirota | 358/340 |
| 4,635,104 | 1/1987 | Hausdörfer et al. | 358/31 |

FOREIGN PATENT DOCUMENTS

| | | | |
|---|---|---|---|
| 110375 | 6/1984 | European Pat. Off. | 360/19.1 |
| 3239423 | 7/1984 | Fed. Rep. of Germany | 360/38.1 |
| 2540697 | 2/1984 | France | 358/340 |

Primary Examiner—Aristotelis Psitos
Attorney, Agent, or Firm—Max Fogiel

[57] ABSTRACT

An arrangement for suppressing edge noise during playback of frequency-modulated video signals recorded on tape, in which the frequency-modulated video signals are supplied to a first demodulator, and the signals at the output of this demodulator are delayed by substantially one line length. The delayed signals are then applied to a second demodulator, and the signals obtained from latter are filtered in a band-pass filter which transmits only signals between 0.5 and 2 MHz. The signals from the first demodulator and the filtered signals are superposed, and the superposed signals are used as luminance signals for playback.

8 Claims, 2 Drawing Sheets

ARRANGEMENT FOR SUPPRESSING EDGE NOISE DURING PLAYBACK OF FREQUENCY MODULATED VIDEO SIGNALS RECORDED ON TAPE

The present application is a continuation of the U.S. patent application Ser. No. 015,057, filed as PCT/EP86/00340, Jun. 6, 1986, now abandoned.

That video signals are subject to noise interference subject to certain conditions is known. Home video recorders for example use little tape per unit of time. The result is that the recorded tracks are very narrow as well as being traced without what are called "yards," intermediate space, that is. This results in the following problems:

First problem: The use of low-quality tape material with a non-uniform coating, particles that are too large, and a poor bond between the support and the magnetic layer ("gunky" tapes) results in dropouts due to the "collapse" of the FM signal when the video heads scan the tape. These malfunctions, specifically, result in poor tape-to-head contact or contamination of the head gap. Depending on the type of FM demodulator employed, dropouts cause black or white interference lines on the screen, which is annoying.

Keying a replacement signal in at the site of the interference is known. Such signals derive from chronologically before the interference and practically consist of a repetition of the signal in existence prior to it. An ultrasonic-delay line with a delay of one line length (64 μsec) is usually employed because most dropouts last between 5 and 25 μsec. Thus, when dropouts occur, the signal from the foregoing line is keyed in at that point. Since two adjacent lines usually have the same signal content, meaning that what is called "line correlation" is in effect, this measure is reliable and causes fewer malfunctions than for example the also known keying in of a "gray value" instead of the malfunctioning original signal. If the dropout lasts longer than 64 μsec, the replacement signal from the delay line is constantly returned from the output terminal to the input terminal and recycled until the interference is over.

Second problem: The yardless tracing of the video tracks necessarily results during playback in video-signal crosstalk between the tracks because the video heads migrate back and forth over part of the particular neighboring track in spite of track readjustment. In spite of the difference between video-head azimuth angles (appr. +6° for VHS) employed as a remedy in present-day conventional recorders, crosstalk results in interference detrimental to the signal-to-noise ratio and generates or augments what is called "edge noise" at the vertical video-signal edges. Furthermore, high-fidelity sound videorecorders, in which the two audio carriers are at approximately 1.6 and 1.8 MHz and are recorded just below the video tracks at an azimuth of ±35°, are subject to crosstalk problems in the video FM from these audio ranges and hence to further signal-edge interference in the video range.

The object of the invention is to solve the aforesaid problems and decrease the effects of noise. This object is attained by the invention characterized in claim 1. Further developments of the invention and a device for carrying out the method are characterized in the subsidiary claims.

Edge noise is in principle suppressed or at least decreased by means of a comb-filter circuit with a 1-H delay line that mediates between two lines and not only wipes out the differences at the vertical signal edges but also increases the signal-edge amplitude and hence reinforces the contours.

One embodiment of the invention will now be specified with reference to the drawing, wherein FIG. 1 is a block diagram of a VHS videorecorder and FIGS. 2a–2d are signals involved in the device illustrated in FIG. 1.

Output signals are supplied to a head amplifier 2 from video heads 1. The output terminal of head amplifier 2 is on the one hand connected to a color path 4 through a deep-pass filter 3 and on the other to a luminance path 6 through a high-pass filter 5. Deep-pass filter 3 allows all 1.2 MHz frequencies through. High-pass filter 5 allows all frequencies over 1.3 MHz through. The frequency-modulated luminance signals are demarcated with a limiter 7. Its output terminal is on the one hand connected to a frequency demodulator 8 and on the other to another frequency demodulator 10 through a delay line 9 of one line period. The output terminals from the two demodulators 8 and 10 are connected to the terminals 11 and 12 of a changeover switch 13, the output terminal 14 of which is connected either directly or through a rise-time compensation circuit 15 to the input terminal of an adding circuit 16. The output terminal of second frequency demodulator 10 is also connected to one input terminal or another of adding circuit 16 through a band-pass filter 17 and amplitude controls 18, an amplifier with a variable output voltage for example. The output signal from adding circuit 16 is the Y or luminance signals. The output signal from limiter 7 is supplied to an error-detection circuit 19, a device called a "dropout detector." Error-detection circuit 19 triggers changeover switch 13, activating demodulator 10 when the luminance signal is disrupted.

FIG. 2a illustrates a video sweep signal available at the output terminal of FM demodulator 8 in the form of the luminance signal Y from a VHS videorecorder for example. Only the component of the original 100-kHz to 5 MHz band width remaining subsequent to demodulation is illustrated. One field takes 20 msec.

Figure 1:
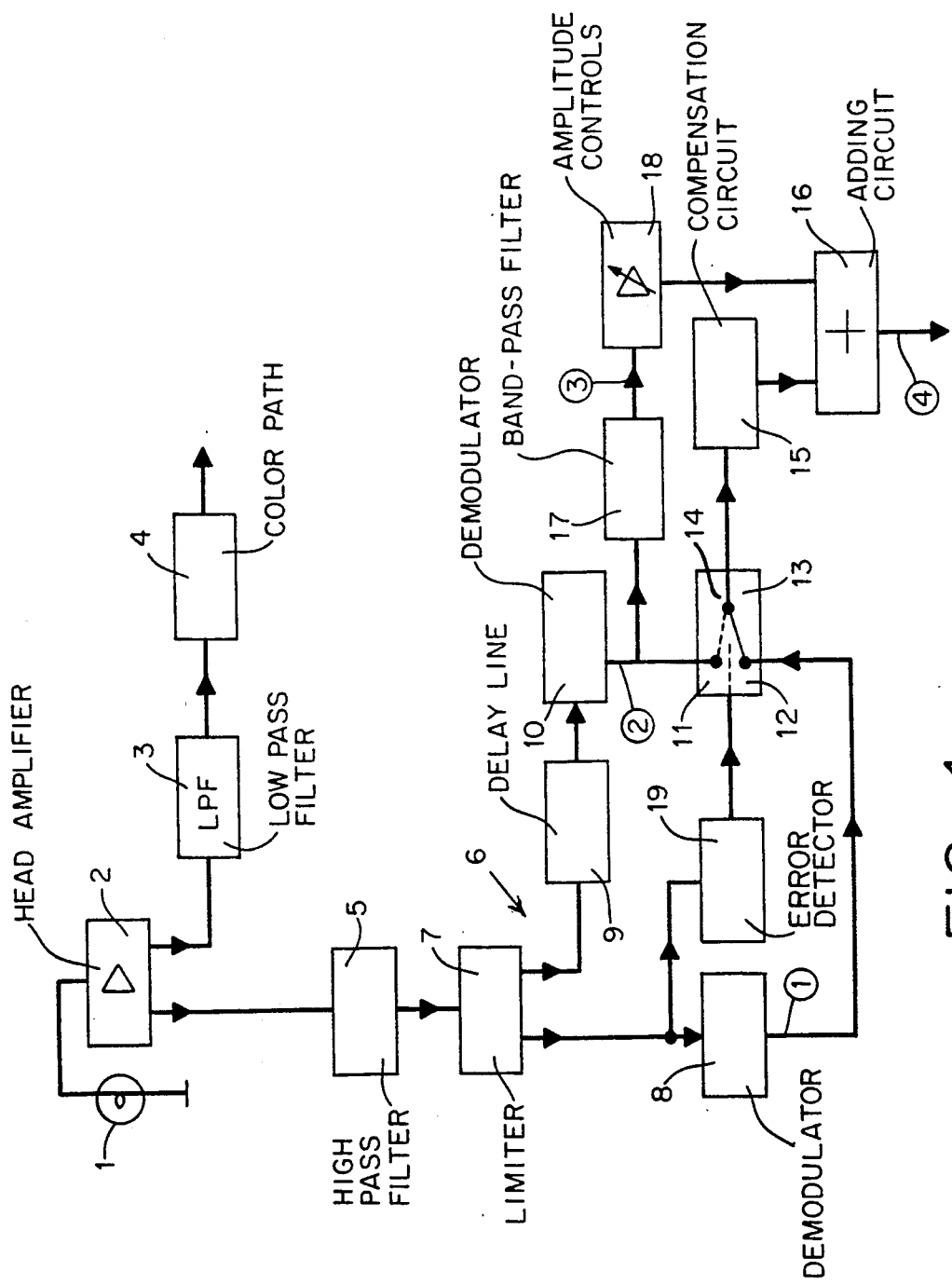
Figure 2A:
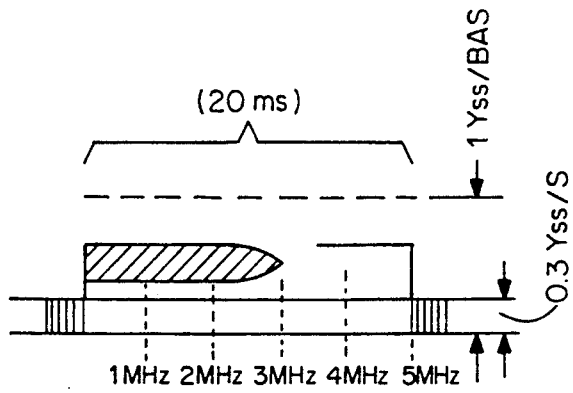
FIG. 2b illustrates the output signal from the FM demodulator 10 that comes into action in the case of dropout. It is definitely reduced in band width by the FM band limitation in the 1-H ultrasound delay line, in a 1-H CCD delay line, or by means of an otherwise obtained delay of one line length.
FIG. 2c illustrates the signal downstream of band-pass filter 17.
FIG. 2d illustrates the noise-reduced luminance output signal from adding circuit 16, which consists of the sum of the rise-time corrected signal from FIG. 2a and one component of the signal from FIG. 2c. The amount of the added signal is dimensioned at 18 to obtain a definite edge-noise minimum on the screen. (This can be done with a previously recorded Philips color-test signal.)
Figure 2B:
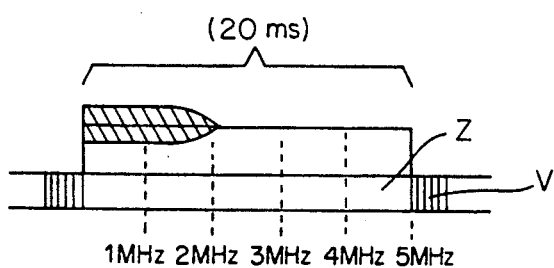
Figure 2C:
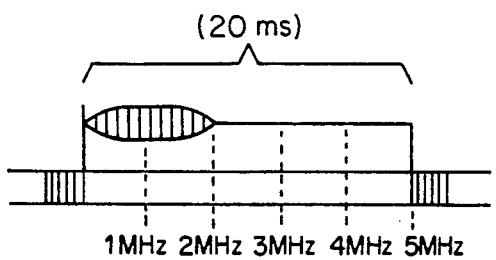
Figure 2D:
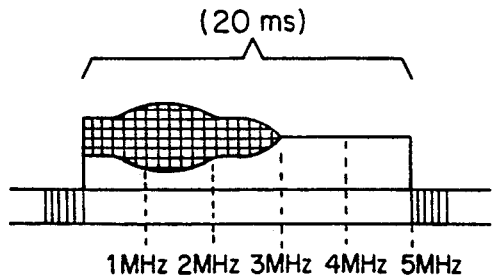

If the delayed and undelayed channels in the circuit previously described had been of the same band width, the video-signal amplitudes would double over the total frequency range from 0 to 3 MHz (with a multiburst signal e.g.), whereas the non-correlated noise components would retain their amplitude. The interference-ratio gain would theoretically then be −6 dB. Unfortunately, however, the channels for video signals are not of the same band width, so that only the lower frequency components of up to 1.5 MHz would double, and the higher frequencies would derive only from the main channel of the first FM demodulator. Any poor frequency procedure on the part of the videorecorder would accordingly be very apparent. Furthermore, the interference-ratio gain would be less than −6 dB because of the different channel band widths. The greatest disadvantage in mediating between two luminance-signal lines would however consist in mediating between deep vertical signal frequencies. A test grid with horizontal lines exhibiting only one line width for example would show a test pattern with lines two video lines wide and with half a signal amplitude subsequent to mediation, so that the vertical and horizontal grid lines would be of different brightness. Thus would be acceptable only with difficulty. It would on the other hand be very easy to obtain an improvement of the structure in the area of vertical edges, and hence also in edge-noise reduction by means of comb filtering. Signal components are then filtered out of the delayed, demodulated, and narrow-band video signal in the approximately 500 kHz to 2 MHz range with band-pass filter and added thus chronologically correct and equalized to the wideband video signal from the undelayed luminance channel in an amplitude that results in an output luminance signal with minimalized edge noise and sharp black-white and white-black transitions. Although the total signal-to-noise ratio is admittedly improved only approximately −1 dB because the comb filtering occurs within only a limited range of the video signal, edge-noise interference and even edge agitation is definitely perceptibly improved. The amplitude rise in the 700 kHz to 2 MHz range resulting from the mediation produces a slight but intentional lifting of the contours in the video signal that delivers a sharper picture impression in an image that simultaneously seems more stable. An advantage is that a cost-effective circuit can be realized by double exploitation of the dropout-delay line. If the amplitude of the delayed channel can be subjected to outside controls within certain limits during comb-filter mediation, the circuit will also be capable of assuming the the function of picture definition. The band width of band-pass filter 17 is selected to allow even interference from the FM audio carrier to be definitely reduced (1.6 and 1.8 MHz). Since these carriers are not correlated, their visibility in the picture will be severely decreased. The FM signal can be presented on the 1-H delay line. It would, however, also be possible to obtain an AM-modulated video signal. Furthermore, it is unnecessary to use a narrow-band ultrasound line, but a wide-band delay line or circuit (CCD) could also be employed for the comb filter.

Comb-filter circuitry with an ultrasound delay line is known from standard PAL decoders. Mediation between two color-line signals can be used to improve the signal-to-noise ratio −6 dB if the band widths of the undelayed and of the delayed signal are equal. At approximately +1 MHz the band width of the ultrasound-delay line will be just sufficient for the color-signal band width. It is, however, not adequate for transmitting the FM luminance signals in VHS videorecorders, meaning that the demodulated luminance signal from the delayed channel is band-width limited.

I claim:

1. A method for suppressing edge noise during playback of frequency-modulated video signals recorded on tape comprising the steps: supplying a frequency-modulated video signal from a frequency-modulated carrier by a first demodulator: supplying a delayed signal from said frequency-modulated carrier by a delay element having a one-line delay time and a second frequency-modulated demodulator: filtering the signals from said second demodulator in a band-pass filter passing through only signals between 0.5 and 2 MHz: adding the signals from said first demodulator to the signals from said filter, the signals from said first demodulator having a substantially unreduced bandwidth at said adding step: and using the added signals as luminance signals for playback.

2. A method as defined in claim 1, including delay equalization on said signal to at least one of the signals added by said adding step.

3. A method as defined in claim 1, including the step of amplitude control to at least one of the signals added by said adding step.

4. A method as defined in claim 1, wherein the signals passed through by said band-pass filter includes high-fidelity FM audio signals.

5. An arrangement in a video recorder for suppressing edge noise during playback of frequency-modulated video signals recorded on tape, comprising: a first demodulator receiving frequency-modulated video signal from a frequency-modulated carrier: time delay means having a one-line delay time and a second demodulator for supplying a delayed signal from said frequency-modulated carrier: a band-pass filter passing through only signals between 0.5 and 2 MHz for filtering the signals from said second demodulator: means for adding the signals from said first demodulator and the filtered signals, the signals from said first demodulator having a substantially unreduced bandwidth when received by said adding means: and means for using the added signals as luminance signals for playback: amplifier means for supplying frequency-modulated luminance signals: a high-pass filter connected to an output of said amplifier means: limiter means connected to an output of said high-pass filter, said limiter means having an output connected to said first demodulator: said time delay means comprising a 1-H delay line connected to another output of said limiter means; said delay line having an output connected to said second demodulator: said adding means being connected at one input terminal with the output of said first demodulator: said band-pass filter being connected to the output of said second demodulator, said band-pass filter having an output connected to another input of said adding means.

6. An arrangement as defined in claim 5, including switching means for connecting said one input to said adding means either to the output of said demodulator or the output of said second demodulator.

7. An arrangement as defined in claim 6, including a detector controlling said switching means so that said adding means is connected to said second demodulator when the luminance signal malfunctions.

8. An arrangement in a video recorder for suppressing edge noise during playback of frequency-modulated video signals recorded on tape, comprising: a first demodulator receiving frequency-modulated video signal from a frequency-modulated carrier: time delay means having a one-line delay time and a second demodulator for supplying a delayed signal from said frequency-modulated carrier: a band-pass filter passing through only signals between 0.5 and 2 MHz for filtering the signals from said second demodulator: means for adding the signals from said first demodulator and the filtered signals, the signals from said first demodulator having a substantially unreduced bandwidth when received by said adding means; and means for using the added signals as luminance signals for playback; amplifier means for supplying frequency-modulated luminance signals; a high-pass filter connected to an output of said amplifier means; limiter means connected to an output of said high-pass filter, said limiter means having an output connected to said first demodulator; said time delay means comprising a 1-H delay line connected to another output of said limiter means; said delay line having an output connected to said second demodulator; said adding means being connected at one input terminal with the output of said first demodulator; said band-pass filter being connected to the output of said second demodulator said band-pass filter having an output connected to another input of said adding means; switching means connected to said adding means at said one input for connecting said one input to either the output of said first demodulator or the output of said second demodulator; detector means for controlling said switching means so that said switching means connects said adding means to said second demodulator when a drop-out condition is detected; said delay line being connected between said limiter means and said second demodulator in a path to said band-pass filter.

* * * * *